Nov. 9, 1943.  C. C. WATSON  2,333,905
PRESSURE REGULATION
Filed Aug. 10, 1942
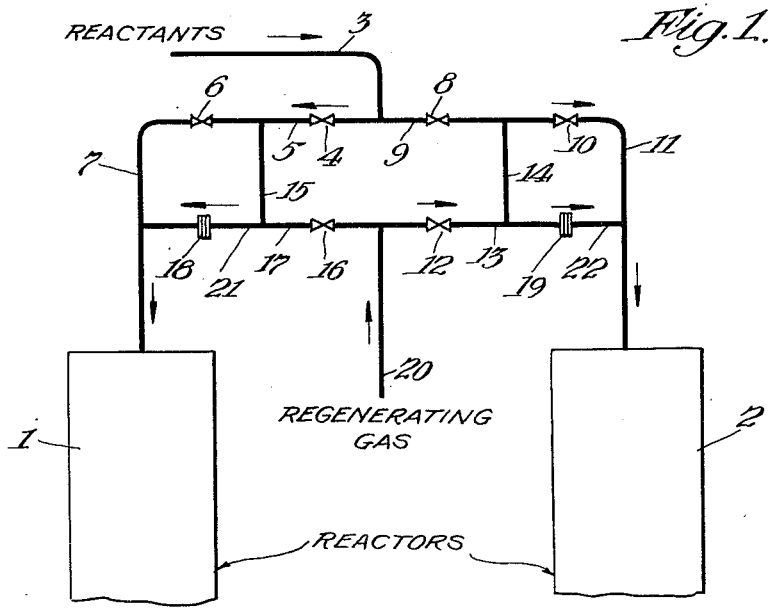
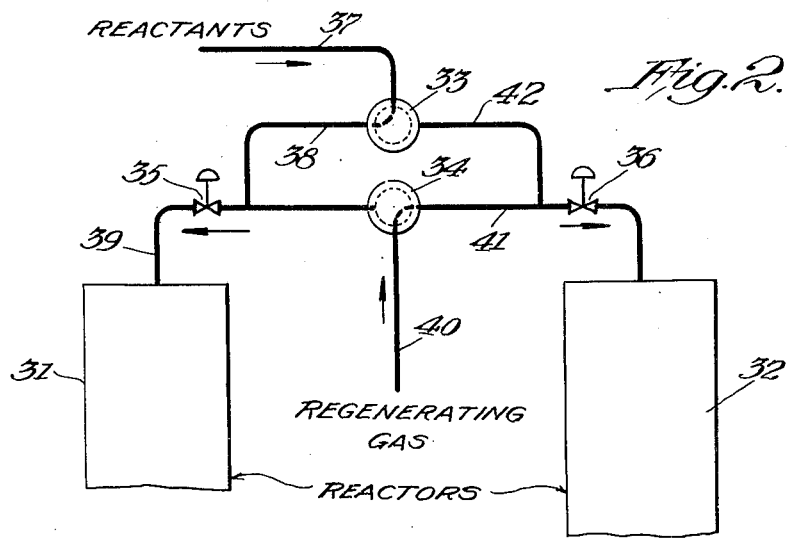
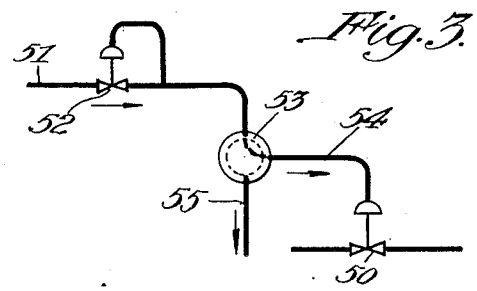
Inventor:
Charles C. Watson,
By Lee J. Gary
Attorney.

Patented Nov. 9, 1943

2,333,905

UNITED STATES PATENT OFFICE 2,333,905

PRESSURE REGULATION

Charles C. Watson, Chicago, Ill., assignor to Universal Oil Products Company, Chicago, Ill., a corporation of Delaware Application August 10, 1942, Serial No. 454,293

6 Claims. (Cl. 196—52)

This invention relates to a method for operating vessels which are to be alternately supplied with separate streams of fluid at different pressures.

More specifically, my invention offers means for advantageously conducting processes wherein the diversion of separate streams of fluid to separate vessels is controlled by means of switch valves.

For example, in hydrocarbon conversion processes such as catalytic cracking, dehydrogenation of butane or butene and the like, employing catalyst masses disposed in separate vessels and wherein each of said masses is alternately contacted by a stream of reactant materials and then a stream of regenerating fluid, this alternate diversion of reactant materials and regenerating fluids in the different catalyst masses is generally accomplished by means of switch valves. Considerable difficulty has occurred, however, in the operation of these valves due to the high temperatures at which the process must be conducted. For instance, the above mentioned dehydrogenation processes usually are carried out at temperature conditions within the range of about 1000 to 1200° F. Also the optimum pressure at which the desired conversion will take place is in the neighborhood of subatmospheric to substantially atmospheric pressure. The most economical pressure for conducting the regeneration portion of the process may be considerably higher than that which is desired for the conversion portion of the process, that is, in the neighborhood of 3 atmospheres or more. The combination of high temperature and relatively large pressure differential across the switch valves has caused leakage to occur between the regenerating fluid and the incoming reactant materials. Due to the nature of the regenerating fluid any leakage thereof into the reactant stream will be detrimental to the hydrocarbon conversion process. For instance, any oxygen, which normally is a component of the regenerating fluid, that might enter the reactant stream will hinder the desired operation of the catalyst.

My invention provides a means for obviating any leakage through the switch valves by supplying both the reactant materials and the regenerating fluid to the switching zone at substantially equal pressures and then reducing the pressure of the reactant materials after it leaves the switching zone, thus maintaining substantially equal pressure on both sides of the switch valves. Even though the high temperature operation may make it difficult to retain a tight closure thereof, very little leakage will occur because of the absence of any pressure differential across the valves.

In order to make the features and advantages of this invention more clearly understood reference is made to the accompanying diagrammatic drawing and the following description thereof.

Fig. 1 of the drawing illustrates one arrangement of switch valves and reducing means suitable for the operation of my invention.

Fig. 2 shows an alternate form of switch valves and pressure reducing means for accomplishing my invention.

Fig. 3 illustrates one form of apparauts by which the pressure reducing means illustrated in Fig. 2 may be regulated.

Referring now to Fig. 1 the numerals 1 and 2 denote two reactors to be alternately employed for processing a stream of reactant materials and for regenerating catalyst masses therein. For instance, if reactor 1 is being employed in the processing period and reactor 2 is being supplied with regenerating fluid valves 4, 10 and 12 of the assembly will be open and valves 6, 8 and 16 will be closed. Reactant materials, therefore, supplied through line 3 at approximately 3 atmospheres will be directed through valve 4, line 5, line 15, line 21, orifice 18, and line 7 into reactor 1. At the same time regenerating fluid at approximately 3 atmospheres pressure supplied through line 20 will be directed through valve 12 in line 13, then in part through line 14 and valve 10 and in part through orifice 19 in line 22, the two parts being thereafter supplied through line 11 to reactor 2. Orifices 18 and 19 are of such a size that the desired reduction in pressure of streams of reactant flowing therethrough is accomplished. For instance, in the process for the dehydrogenation of butane this reduction of pressure will be from about 3 atmospheres down to about 1 atmosphere or less. Valves 6 and 10 are of such a size that substantially no pressure drop is obtained therethrough by this arrangement, the pressures on both sides of the closed valves 8 and 16, which are at the same time exposed to two different fluids, are maintained substantially equal, thus practically eliminating any leakage through these valves. By closing valve 6 all of the reactant materials must necessarily flow through the orifice 18, thus reducing the pressure thereof to that desired for the conversion process.

To switch the operation of reactors 1 and 2 from processing to regenerating and from regenerating to processing, respectively, valves 4, 10 and 12 will be closed and valves 6, 8 and 10 will be open. These various valves may be controlled by means of suitable automatic time-operated equipment or they may be individually manually operated.

Fig. 2 illustrates a modified form of a switching valve arrangement and pressure reducing means by which the catalyst masses disposed in reactors 31 and 32 may be alternately contacted with reactant materials and regenerating gases. The switching is accomplished by means of three-way valves 33 and 34 and the pressure reduction is obtained by means of valves 35 and 36. Valves 35 and 36 may be any one of a number of different types which may be adjusted to operate in two different positions, one of which will give the desired pressure drop and the other of which will give substantially no pressure drop therethrough. When reactor 31 is being employed in the processing period valve 33 will be positioned as shown in Fig. 2, that is, in such a manner that the reactant materials supplied by line 37 will be directed by valve 33, line 38, valve 35 and line 39 into reactor 31. At the same time regenerating gas supplied through line 40 will be directed by valve 34 through line 41 and valve 36 into reactor 32. During the time the reactant materials are being diverted to reactor 31 valve 35 will be positioned to give a pressure reduction as desired and valve 36 will be positioned to give substantially no pressure drop.

When the operation of reactors 31 and 32 is switched to regenerating and processing respectively, valves 33 and 34 will be rotated 90 degrees in a clockwise direction thus directing reactants through line 42, line 41 and valve 36 to reactor 32 and regenerating gas through valve 35 and line 39 to reactor 31. During this period valve 36 will be positioned to give the desired pressure drop and valve 35 will be wide open.

Fig. 3 illustrates a piping arrangement by means of which valves 35 and 36 may be regulated. In Fig. 3 valve 50 represents a spring loaded fluid pressure operated valve. The spring may be adjusted to maintain the valve in a substantially wide-open position and when suitable pressure is applied to the diaphragm the valve will attain a position which will give the desired pressure drop therethrough. Air introduced through line 51 is maintained at substantially constant pressure by a suitable pressure regulating valve 52. When valve 50 is to be maintained as a pressure reducing valve the three-way switch 53 will be positioned as shown, that is, to allow a pressure of air on the diaphragm of valve 50. For the other setting of valve 50, that is, when no pressure drop is desired, three-way valve 53 will be turned forward, that is, clockwise 90 degrees connecting the diaphragm of valve 50 by means of line 54 to vent line 55, thus relieving the air pressure upon the diaphragm and allowing the valve to assume the position dictated by the spring. The admission of air of controlled pressure to the three-way valves such as number 53, may be directed by the same hand or cycle-timer controlled valve which furnishes air to operate valves 33 and 34.

The above mentioned hydrocarbon conversion processes are included in this specification only to aid in illustrating the operation of my invention and are not to be construed as limiting it in any way. My invention may be advantageously applied to many other processes in which fluids of different pressures are alternately supplied to separate vessels.

I claim as my invention:

1. In a process wherein separate vessels are alternately operated at different pressures and separate streams of fluids are alternately supplied to each vessel, the diversion of said streams of fluid being accomplished in a switching zone, the improvement which comprises supplying said separate fluids to said switching zone at substantially equal pressures and reducing the pressure of that stream which is directed to the lower pressure vessel after it leaves the switching zone.

2. In a process wherein separate vessels are alternately operated at different pressures and separate streams of fluids are alternately supplied to each vessel, the diversion of said streams of fluid being accomplished in a switching zone, the improvement which comprises supplying said separate fluids to said switching zone at substantially equal pressures and reducing the pressure of that stream which is directed to the lower pressure vessel after it leaves the switching zone and before it enters the vessel.

3. In a process wherein each of a pair of vessels is alternately operated at a different pressure and two separate streams of fluids are alternately supplied to each vessel, the diversion of each stream of fluid being accomplished in a switching zone, the improvement which comprises supplying said separate fluids to said switching zone at substantially equal pressures and reducing the pressure of that stream which is directed to the lower pressure vessel after it leaves the switching zone.

4. In a process wherein each of a pair of vessels is alternately operated at a different pressure and two separate streams of fluids are alternately supplied to each vessel, the diversion of each stream of fluid being accomplished in a switching zone, the improvement which comprises supplying said separate fluids to said switching zone at substantially equal pressures and reducing the pressure of that stream which is directed to the lower pressure vessel after it leaves the switching zone and before it enters the vessel.

5. In a process for the treatment of hydrocarbon oils wherein masses of finely divided material disposed in separate vessels are alternately contacted by separate streams of fluid at different pressures and the diversion of said streams of fluid to the separate vessels is accomplished in a switching zone, the improvement which comprises supplying said separate streams of fluid to the switching zone at substantially equal pressures and reducing the pressure of that stream which is directed to the lower pressure vessel after it leaves the switching zone.

6. In a process wherein separate vessels are alternately and simultaneously operated at different pressures and separate streams of fluids are alternately and simultaneously supplied to each vessel, the diversion of each stream of fluid being accomplished in a switching zone, the improvement which comprises supplying said separate fluids to said switching zone at substantially equal pressures and reducing the pressure of that stream which is directed to the lower pressure vessel after it leaves the switching zone and before it enters the vessel.

CHARLES C. WATSON.